United States Patent
Wang et al.

(10) Patent No.: US 10,665,951 B2
(45) Date of Patent: May 26, 2020

(54) ANTENNA FOR MOBILE PHONE AND MOBILE PHONE HAVING THE SAME

(71) Applicant: BYD COMPANY LIMITED, Shenzhen (CN)

(72) Inventors: Yijin Wang, Shenzhen (CN); Lianhua Li, Shenzhen (CN); Wensong Wang, Shenzhen (CN); Munyong Choi, Shenzhen (CN); Faping Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 338 days.

(21) Appl. No.: 15/531,629

(22) PCT Filed: Nov. 20, 2015

(86) PCT No.: PCT/CN2015/095206
§ 371 (c)(1),
(2) Date: May 30, 2017

(87) PCT Pub. No.: WO2016/082719
PCT Pub. Date: Jun. 2, 2016

(65) Prior Publication Data
US 2017/0331196 A1    Nov. 16, 2017

(30) Foreign Application Priority Data
Nov. 28, 2014    (CN) .......................... 2014 1 0709050

(51) Int. Cl.
*H01Q 13/10*    (2006.01)
*H01Q 1/48*    (2006.01)
(Continued)

(52) U.S. Cl.
CPC ............ *H01Q 13/106* (2013.01); *H01Q 1/243* (2013.01); *H01Q 1/38* (2013.01); *H01Q 1/48* (2013.01);
(Continued)

(58) Field of Classification Search
CPC ........ H01Q 1/243; H01Q 1/38; H01Q 9/0421; H01Q 1/42; H01Q 1/12
(Continued)

(56) References Cited

U.S. PATENT DOCUMENTS

2009/0174604 A1    7/2009    Keskitalo et al.
2009/0278757 A1*   11/2009   Ahn .................. H01Q 1/243
                                              343/767

(Continued)

FOREIGN PATENT DOCUMENTS

CN    102227036 A    10/2011
CN    102368575 A    3/2012
(Continued)

OTHER PUBLICATIONS

The World Intellectual Property Organization (WIPO) International Search Report for PCT/CN2015/095206 dated Feb. 29, 2016 pp. 1-3.

*Primary Examiner* — Daniel Munoz
(74) *Attorney, Agent, or Firm* — Anova Law Group, PLLC (57) ABSTRACT

An antenna for a mobile phone and a mobile phone having the same are provided. The antenna for a mobile phone includes: a metal mobile phone case provided with a first slot and a second slot intersecting with the first slot; a circuit board having a clearance zone and a parasitic branch stretching into the clearance zone, and disposed within the metal mobile phone case; an exciting sheet disposed between the circuit board and the metal mobile phone case, and across
(Continued)

the first slot in a width direction of the first slot; a dielectric filler disposed between the exciting sheet and the metal mobile phone case, and configured to fill the first slot and the second slot.

17 Claims, 7 Drawing Sheets

(51) Int. Cl.
  *H01Q 5/378* (2015.01)
  *H01Q 1/38* (2006.01)
  *H01Q 1/24* (2006.01)
  *H01Q 13/12* (2006.01)
  *H04B 1/034* (2006.01)

(52) U.S. Cl.
  CPC ............. *H01Q 5/378* (2015.01); *H01Q 13/10* (2013.01); *H01Q 13/12* (2013.01); *H04B 1/034* (2013.01)

(58) Field of Classification Search
  USPC ........................................ 343/702, 872, 878
  See application file for complete search history.

(56) References Cited

U.S. PATENT DOCUMENTS

| 2010/0238076 A1* | 9/2010 | Lin ........................ H01Q 1/243 343/702 |
| 2013/0038494 A1 | 2/2013 | Kuonanoja |
| 2014/0009345 A1* | 1/2014 | Sung ...................... H01Q 1/243 343/702 |
| 2014/0078009 A1* | 3/2014 | Wong ..................... H01Q 21/28 343/728 |

FOREIGN PATENT DOCUMENTS

| CN | 102736686 A | 10/2012 |
| CN | 103390793 A | 11/2013 |
| CN | 103579754 A | 2/2014 |
| CN | 103633426 A | 3/2014 |
| CN | 203536554 U | 4/2014 |
| CN | 203950905 U | 11/2014 |
| EP | 2621017 A1 | 7/2013 |
| JP | 2013005431 A | 1/2013 |

* cited by examiner

Fig. 7

ANTENNA FOR MOBILE PHONE AND MOBILE PHONE HAVING THE SAME

CROSS-REFERENCE TO RELATED APPLICATION

This application is a national phase entry under 35 U.S.C. § 371 of International Application No. PCT/CN2015/095206, filed on Nov. 20, 2015, which claims priority to and benefits of Chinese Patent Application Serial No. 201410709050.7, filed with the State Intellectual Property Office of P. R. China on Nov. 28, 2014, the entire content of all of which is incorporated herein by reference.

FIELD

The present disclosure relates to a communication equipment, and more particularly to an antenna for a mobile phone and a mobile phone having the same.

BACKGROUND

In the related art, an antenna for a mobile phone is composed of a first slot and a second slot positioned at a communication area of a case, a dielectric substrate and a microstrip feeding part. The first slot is used to radiate a first frequency bandwidth signal, the second slot is used to radiate a second frequency bandwidth signal whose frequency is higher than that of the first frequency bandwidth signal, the dielectric substrate covers the first slot and the second slot, and the microstrip feeding part is used to excite the radiation of the first and second slots.

Since the frequency signal is radiated only by the slot, the frequency signal has a limited bandwidth, and two gaps can only separately generate two resonant and radiate two different frequency bandwidth signals, which cannot meet the requirements of ultra-wideband technology communication in the 4G era. In addition, the slot cannot be used as a sound transmission holes in the mobile phone frequency communication, thus not only affecting the appearance of the mobile phone, but also causing dust to enter easily.

SUMMARY

Embodiments of the present disclosure seek to solve at least one of the problems existing in the related art to at least some extent. For this, the present disclosure provides an antenna for a mobile phone, which has a plurality of advantages of wide wideband, meeting 2G, 3G and 4G communication, neat and beautiful appearance and good dustproof performance.

The present disclosure further provides a mobile phone including the antenna for a mobile phone.

In order to achieve the above purposes, according to embodiments of a first aspect of the present disclosure, an antenna for a mobile phone is provided, and the antenna for a mobile phone includes: a metal mobile phone case provided with a first slot and a second slot intersecting with the first slot; a circuit board having a clearance zone and a parasitic branch stretching into the clearance zone, and disposed within the metal mobile phone case; an exciting sheet disposed between the circuit board and the metal mobile phone case, and across the first slot in a width direction of the first slot; and a dielectric filler disposed between the exciting sheet and the metal mobile phone case, and configured to fill the first slot and the second slot.

The antenna for a mobile phone according to embodiments of the present disclosure has a plurality of advantages of wide wideband, meeting 2G, 3G and 4G communication, neat and beautiful appearance and good dustproof performance.

In addition, the antenna for a mobile phone according to embodiments of the present disclosure may further have the following additional technical features.

In an embodiment, the first slot extends in a transverse direction of the metal mobile phone case and is positioned at a lower part of the metal mobile phone case, and the second slot extends in a longitudinal direction of the metal mobile phone case and defines an upper end intersecting with the first slot.

In an embodiment, the metal mobile phone case is provided with a groove extending in the longitudinal direction of the metal mobile phone and defining an upper end intersecting with the first slot, and the groove is symmetrical with the second slot with respect to a longitudinal center line of the metal mobile phone case and filled with the dielectric filler.

In some embodiments, the first slot has a width of about 1-3 mm and a length of about 60-70 mm.

In some embodiments, the second slot has a width of about 1-3 mm and a length of about 8-16 mm.

In some embodiments, the groove has a width of about 1-3 mm, a length of 8-16 mm and a depth of about 0.1-0.3 mm.

In an embodiment, the exciting sheet includes: a horizontal branch extending in the transverse direction of the metal mobile phone case and positioned below the first slot; and a vertical branch extending in the longitudinal direction of the metal mobile phone case, defining a lower end connected with a first end of the horizontal branch and an upper end provided with a feeding signal access point, and across the first slot in the width direction of the first slot.

In some embodiments, the horizontal branch has a length of about 15-21 mm and a width of about 1-3 mm, and the vertical branch has a length of about 7-13 mm and a width of about 5-9 mm.

In an embodiment, the dielectric filler includes: an isolating part disposed between the metal mobile phone case and the exciting sheet; a first slot filling part disposed at the isolating part and configured to fill the first slot; a second slot filling part disposed at the isolating part and configured to fill the second slot; and a groove filling part disposed at the isolating part and configure to fill the groove.

In some embodiments, a distance between the exciting sheet and an inner surface of the metal mobile phone case is in a range of about 0.5-1 mm.

In an embodiment, the dielectric filler has a dielectric constant less than 3.

In an embodiment, a distance between the circuit board and an inner surface of the metal mobile phone case is in a range of about 2-4 mm.

In an embodiment, the circuit board includes an insulating layer and a plurality of conducting layers, and the clearance zone is formed by removing the conducting layer in a partial region of the insulating layer.

In an embodiment, the clearance zone is positioned at a lower end of the circuit board.

In some embodiments, the circuit board has a length of about 115-127 mm and a width of about 58-66 mm, and the clearance zone has a length of about 58-66 mm and a width of about 5-9 mm.

In an embodiment, the parasitic branch is configured to have an L-shape.

In an embodiment, each of two longitudinal edges of the circuit board is provided with two earth lugs abutting against the metal mobile phone case.

According to embodiments of a second aspect of the present disclosure, a mobile phone is provided, and the mobile phone includes the antenna for a mobile phone according to embodiments of the first aspect of the present disclosure.

The mobile phone according to embodiments of the present disclosure has a plurality of advantages of good antenna performance, neat and beautiful appearance and good dustproof performance.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS metal mobile phone case 10, first slot 11, second slot 12, groove 13, circuit board 20, clearance zone 21, parasitic branch 22, earth lug 23, exciting sheet 30, horizontal branch 31, vertical branch 32, feeding signal access point 33, dielectric filler 40, isolating part 41, first slot filling part 42, second slot filling part 43, groove filling part 44.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

An antenna for a mobile phone according to specific embodiments of the present disclosure will be described below referring to drawings. An upper and lower direction herein refers to an upper and lower direction in which a mobile phone is normally used, an inner and outer direction herein refers to an inner and outer direction in which the mobile phone is normally used, a transverse direction of a metal mobile phone case 10 is represented by arrow A in FIG. 1, and a longitudinal direction of the metal mobile phone case 10 is represented by arrow B in FIG. 1.

As shown in FIG. 1-FIG. 7, the antenna for a mobile phone according to embodiments of the present disclosure includes a metal mobile phone case 10, a circuit board (PCB) 20, an exciting sheet 30 and a dielectric filler 40.

The metal mobile phone case 10 is provided with a first slot 11 and a second slot 12 intersecting with the first slot 11. The circuit board 20 has a clearance zone 21 and a parasitic branch 22 stretching into the clearance zone 21, and is disposed within the metal mobile phone case 10. The exciting sheet 30 is disposed between the circuit board 20 and the metal mobile phone case 10, and across the first slot 11 in a width direction of the first slot 11. It will be appreciated to those who skilled in the related art that, the width direction of the first slot 11 refers to a extending direction of a short edge of the first slot 11. The dielectric filler 40 is disposed between the exciting sheet 30 and the metal mobile phone case 10, and fills the first slot 10 and the second slot 12.

According to some embodiments of the present disclosure, the antenna for a mobile phone uses the metal mobile phone case 10 as a radiant surface, which may avoid the antenna signal from being shielded, and may improve the space utilization of the antenna.

Moreover, in some embodiments, as the metal mobile phone case 10 is provided with the first slot 11 and the second slot 12 intersecting with each other and the circuit board 20 is provided with the clearance zone 21 and the parasitic branch 22 stretching into the clearance zone 21, an edge of the metal mobile phone case 10 adjacent to the first slot 11 is separated into a first resonance branch L1 and a second resonance branch L2 by the second slot 12, in which the first resonance branch L1 generates a first resonance point to cover a low frequency band (about 824 MHz to 960 MHz), a second resonance point is generated by the second resonance branch L2 and a third resonance point is generated by the parasitic branch 22 of the circuit board 20, the second and third resonance points are combined to expand a high frequency bandwidth so as to obtain a high frequency band (about 1710 MHz to 2690 MHz), and thus the antenna for a mobile phone provided by the present disclosure has a wide bandwidth. In other words, the antenna for a mobile phone mainly relies on a radiation of the slot and the formed resonance branch, rather than just relies on the radiation of the slot.

Besides, in some embodiments, an antenna performance can be effectively improved by disposing the exciting sheet 30, and an antenna bandwidth can be expanded by disposing the parasitic branch 22 to cover multiple frequency bands at the same time. The first slot 11 and the second slot 12 are filled by utilizing the dielectric filler 40 in an integration molding manner, thus not only isolating the exciting sheet 30 from the metal mobile phone case 10, but also beautifying the appearance of the mobile phone and preventing dust from entering at the same time.

Figure 7:
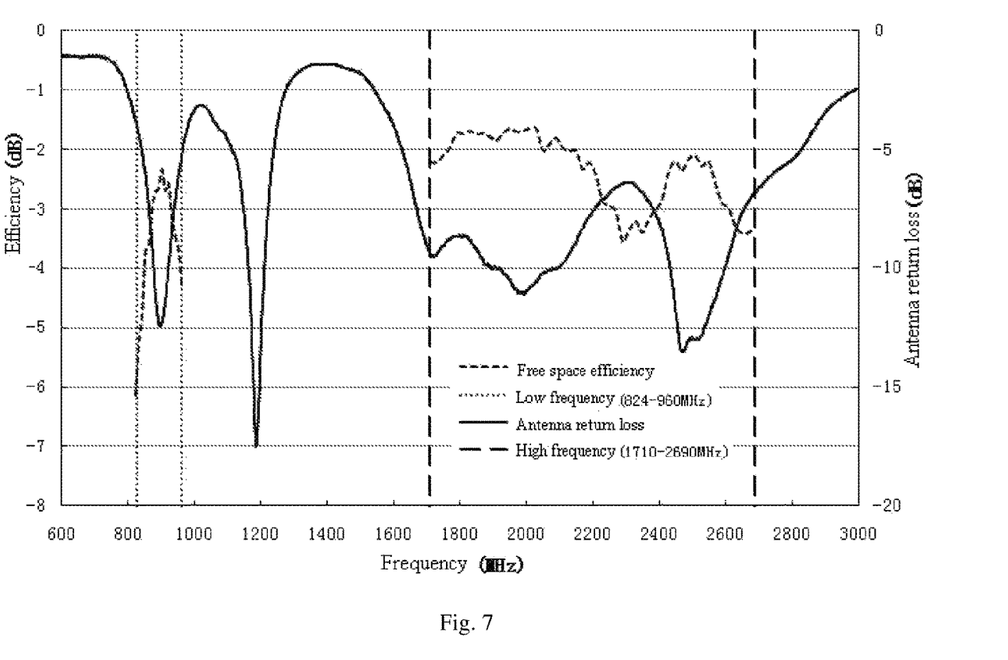
FIG. 7 is a schematic view of a frequency band and efficiency of an antenna for a mobile phone according to embodiments of the present disclosure.

As shown in FIG. 7, by testing the frequency band and the efficiency of the antenna for the mobile phone, it indicates that the performances of the antenna for the mobile phone are excellent in all aspects.

Therefore, the antenna for a mobile phone according to embodiments of the present disclosure can be used for normal wireless communication and cover the frequency band of 824 MHz to 960 MHz, and also has advantages of wide wideband, meeting 2G, 3G and 4G communication, neat and beautiful appearance and good dustproof performance.

The antenna for a mobile phone according to specific embodiments of the present disclosure will be described below referring to drawings.

In some specific embodiments of the present disclosure, as shown in FIG. 1-FIG. 6, the antenna for a mobile phone according to embodiments of the present disclosure includes the metal mobile phone case 10, the circuit board 20, the exciting sheet 30 and the dielectric filler 40.

Specifically, a distance between the circuit board 20 and an inner surface of the metal mobile phone case 10 is in a range of about 2-4 mm, and a distance between the exciting sheet 30 and the inner surface of the metal mobile phone case 10 is in a range of about 0.5-1 mm. In one instance, the distance between the circuit board 20 and the inner surface of the metal mobile phone case 10 is 4 mm, and the distance between the exciting sheet 30 and the inner surface of the metal mobile phone case 10 is 0.5 mm.

Figure 1:
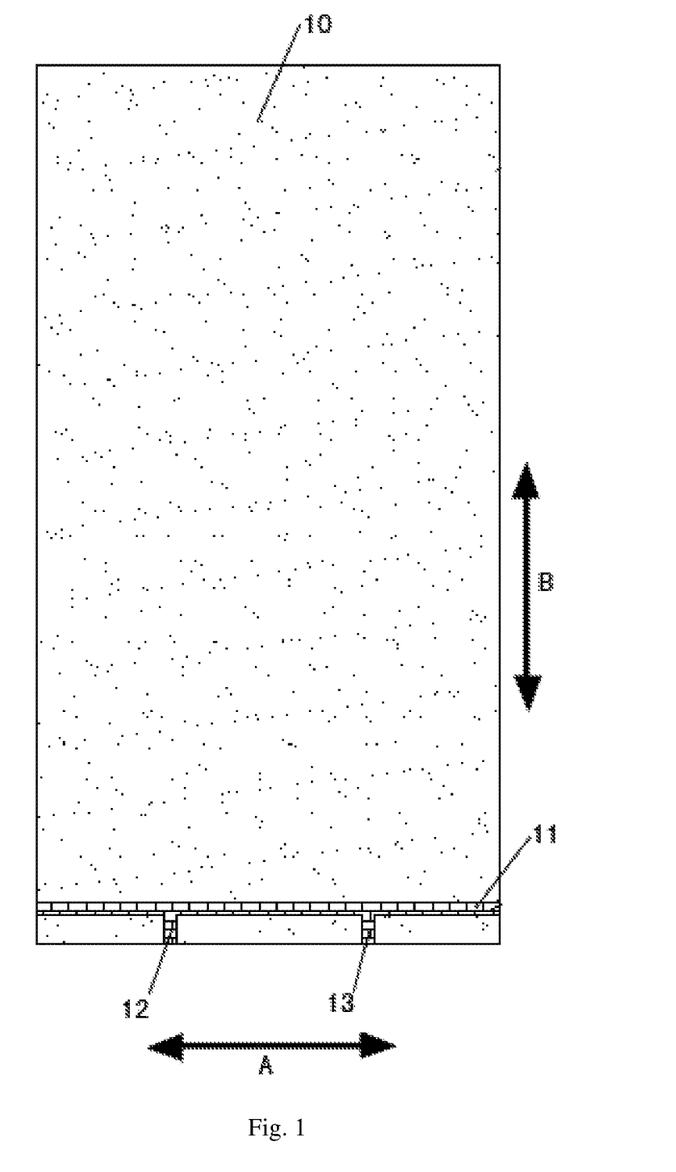
FIG. 1 is a schematic view of a metal mobile phone case of an antenna for a mobile phone according to embodiments of the present disclosure.
Figure 2:
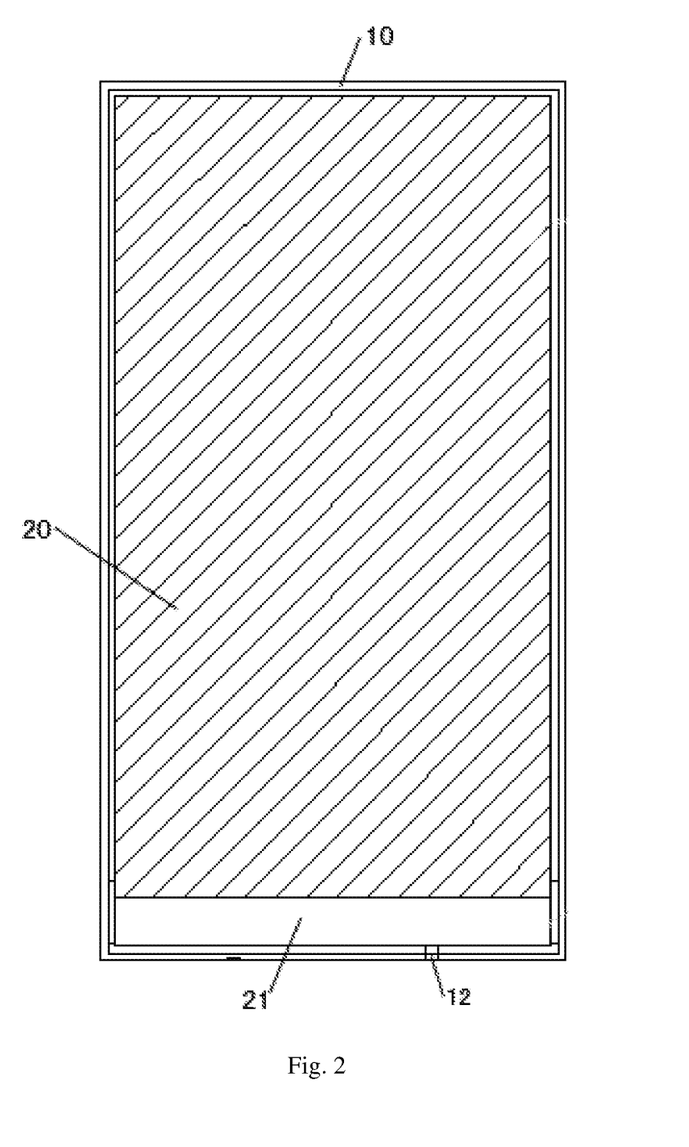
FIG. 2 is a schematic view of a metal mobile phone case and a circuit board of an antenna for a mobile phone according to embodiments of the present disclosure.

In some specific embodiments of the present disclosure, as shown in FIG. 1, the first slot 11 extends in the transverse direction of the metal mobile phone case 10 and is positioned at a lower part of the metal mobile phone case 10. The second slot 12 extends in the longitudinal direction of the metal mobile phone case 10 and has an upper end intersecting with the first slot 11, in which a width direction of the first slot 11 is the longitudinal direction of the metal mobile phone case 10. In other words, the first slot 11 is close to a bottom edge of the metal mobile phone case 10 and extends in the transverse direction of the metal mobile phone case 10, and two ends of the first slot 11 are closed. The second slot 12 is perpendicular to the first slot 11 and extends in the longitudinal direction of the metal mobile phone case 10, and has a first end (the upper end thereof as shown in FIG. 1) communicated with the first slot 11 and a second end (a lower end thereof as shown in FIG. 1) extending to the bottom edge of the metal mobile phone case 10 and opened thereat.

Further, the metal mobile phone case 100 is further provided with a groove 13 extending in the longitudinal direction of the metal mobile phone case 10 and having an upper end intersecting with the first slot, and the groove 13 is symmetrical with the second slot 12 with respect to a longitudinal center line of the metal mobile phone case 10 and filled with the dielectric filler 40. In other words, the groove 13 is perpendicular to the first slot 11 and extends in the longitudinal direction of the metal mobile phone case 10, and has a first end (the upper end thereof as shown in FIG. 1) communicated with the first slot 11 and a second end (a lower end thereof as shown in FIG. 1) extending to the bottom edge of the metal mobile phone case 10 and opened thereat. It should be appreciated to those who skilled in the related art that, the first slot 11 and the second slot 12 penetrate through the metal mobile phone case 10 in a thickness direction of the metal mobile phone case 10, while the groove 13 dose not penetrate through the metal mobile phone case 10. By disposing the groove 13 in the metal mobile phone case 10, a fictional third gap can be formed by the groove 13, such that the groove 13 is symmetrical with the second slot 12 in the appearance of the metal mobile phone case 10, thus resulting in a beautiful effect.

In some instances, the first slot 11 has a width of about 1-3 mm and a length of about 60-70 mm. The second slot 12 has a width of about 1-3 mm and a length of about 8-16 mm. the groove 13 has a width of about 1-3 mm, a length of about 8-16 mm and a depth of about 0.1-0.3 mm.

In one instance, the first slot 11 has the width of 2 mm and a length of 65 mm. The second slot 12 has a width of 2 mm and a length of 12 mm. The groove 13 has a width of 2 mm, a length of 12 mm and a depth of 0.2 mm.

Figure 3:
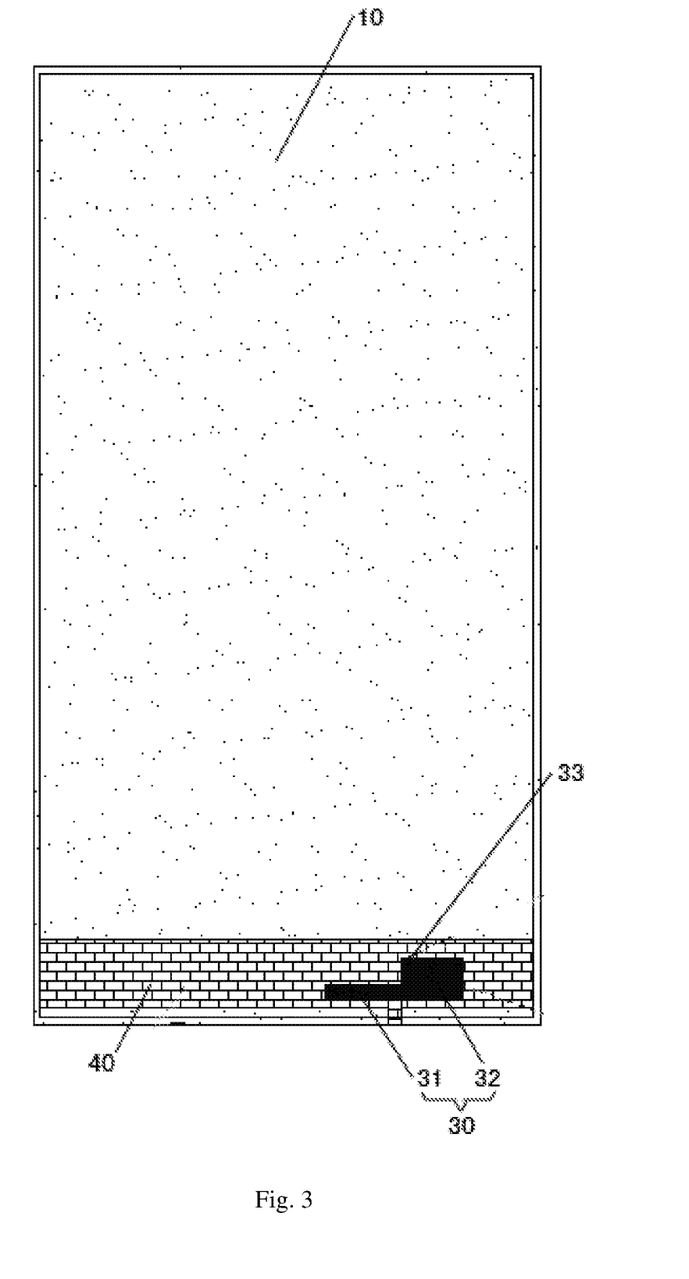
FIG. 3 is a schematic view of an antenna for a mobile phone according to embodiments of the present disclosure, in which a circuit board is not shown.
Figure 4:
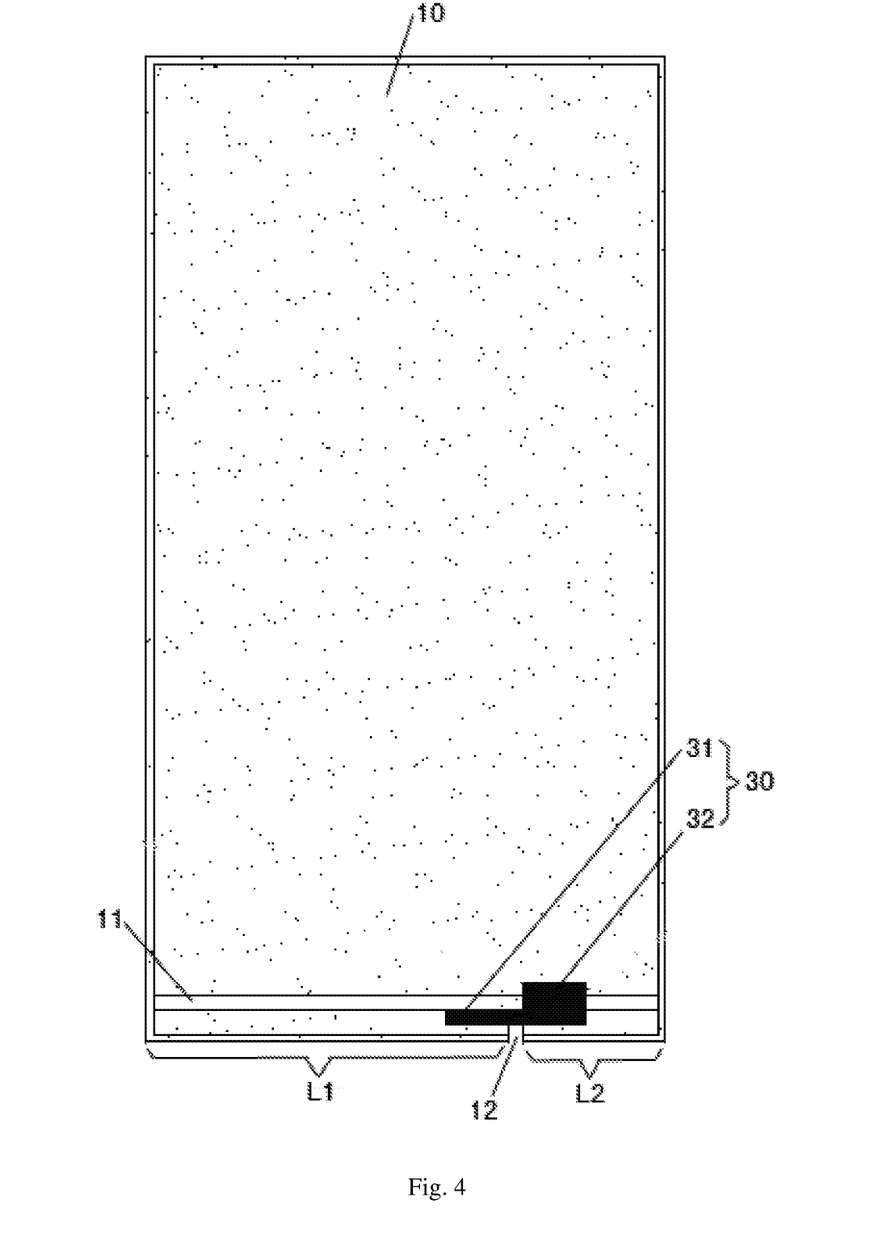
FIG. 4 is a schematic view of a metal mobile phone case and an exciting sheet of an antenna for a mobile phone according to embodiments of the present disclosure.

In some specific embodiments of the present disclosure, as shown in FIG. 3 and FIG. 4, the exciting sheet 30 includes a horizontal branch 31 and a vertical branch 32. The exciting sheet 30 extends in the transverse direction of the metal mobile phone case 10 and is positioned below the first slot 11. The vertical branch 32 extends in the longitudinal direction of the metal mobile phone case 10, has a lower end connected with a first end of the horizontal branch 31 and an upper end provided with a feeding signal access point 33, and is across the first slot 11 in the width direction of the first slot 11. Thus, an exciting effect of the exciting sheet 30 can be ensured.

The horizontal branch 31 has a length of about 15-21 mm and a width of about 1-3 mm. The vertical branch 32 has a length of about 7-13 mm and a width of about 5-9 mm. In one instance, the horizontal branch 31 has a length of 18 mm and a width of 2 mm. The vertical branch 32 has a length of 10 mm and a width of 7 mm.

It should be appreciated to those who skilled in the related art that, a position relationship between the horizontal branch 31 and the second slot 12 may be set according to actual applications and needs. An example in which the horizontal branch 31 is across the second slot 12 is shown in the drawings.

Figure 5:
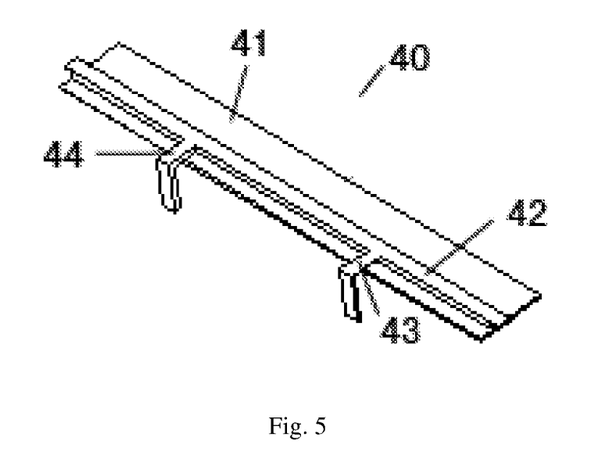
FIG. 5 is a schematic view of a dielectric filler of an antenna for a mobile phone according to embodiments of the present disclosure.

In some specific embodiments of the present disclosure, as shown in FIG. 5, the dielectric filler 40 includes an isolating part 41, a first slot filling part 42, a second slot filling part 43 and a groove filling part 44. The isolating part 41 is disposed between the metal mobile phone case 10 and the exciting sheet 30 for isolating the metal mobile phone case 10 from the exciting sheet 30. The first slot filling part 42 is disposed at the isolating part 41 and used for filling the first slot 11. The second slot filling part 43 is disposed at the isolating part 41 and used for filling the second slot 12. The groove filling part 44 is disposed at the isolating part 41 and used for filling the groove 13.

In order to guarantee an isolation effect of the dielectric filler 40, the dielectric filler 40 has a dielectric constant less than 3.

Figure 6:
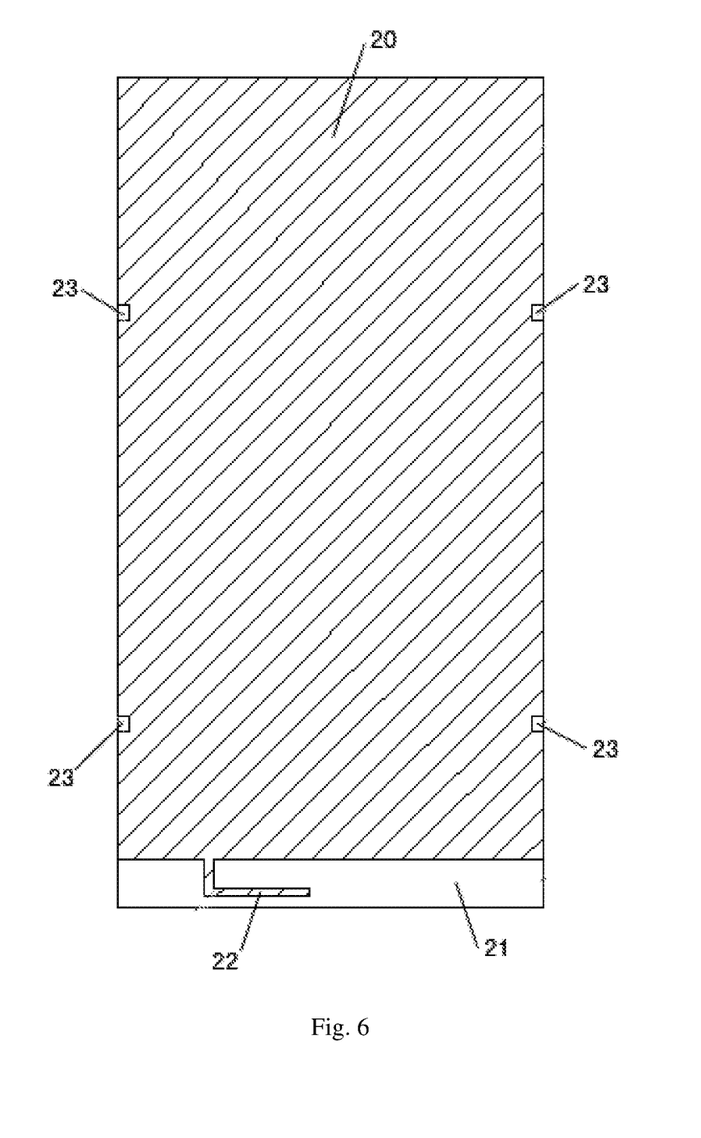
FIG. 6 is a schematic view of a circuit board of an antenna for a mobile phone according to embodiments of the present disclosure.

In some specific embodiments of the present disclosure, as shown in FIG. 6, the circuit board 20 includes an insulating layer and a plurality of conducting layers. The clearance zone 21 may be formed by removing the conducting layer in a partial region of the insulating layer, and positioned at a lower end of the circuit board 20. The parasitic branch 22 may be formed by the conducting layer without being removed within the clearance zone 21, and may be configured to have an L-shape.

In some instances, the circuit board 20 has a length of about 115-127 mm and a width of about 58-66 mm. The clearance zone 21 has a length of about 58-66 mm and a width of about 5-9 mm. In one instance, the circuit board 20 has a length of 122 mm and a width of 62 mm. The clearance zone 21 has a length of 62 mm and a width of 7 mm.

It should be appreciated to those who skilled in the related art that, a position relationship between the parasitic branch 22 and the exciting sheet 30 may be set according to actual applications and needs.

Optionally, as shown in FIG. 6, each of two longitudinal edges of the circuit board 20 is respectively provided with two earth lugs 23, and the earth lugs 23 abut against a side wall of the metal mobile phone case 10 respectively.

The mobile phone according to embodiments of the present disclosure will be described below referring to the drawings. The mobile phone according to embodiments of the present disclosure includes the antenna for a mobile phone according to above embodiments of the present disclosure.

By using the antenna for a mobile phone according to above embodiments of the present disclosure, the mobile phone according to embodiments of the present disclosure has a plurality of advantages of good antenna performance, neat and beautiful appearance and good dustproof performance.

Other components and operations of the mobile phone according to embodiments of the present disclosure are known to those who skilled in the related art, and will not be elaborated herein.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An antenna for a mobile phone, comprising:
    a metal mobile phone case provided with a first slot and a second slot intersecting with the first slot;
    a circuit board having a clearance zone and a parasitic branch stretching into the clearance zone, and disposed within the metal mobile phone case;
    an exciting sheet disposed between the circuit board and the metal mobile phone case, and across the first slot in a width direction of the first slot; and
    a dielectric filler disposed between the exciting sheet and the metal mobile phone case, and configured to fill the first slot and the second slot,
    wherein:
    the first slot extends in a transverse direction of the metal mobile phone case and positioned at a lower part of the metal mobile phone case, and the second slot extends in a longitudinal direction of the metal mobile phone case and defines an upper end intersecting with the first slot;
    an edge of the metal mobile phone case adjacent to the first slot is separated into a first resonance branch and a second resonance branch by the second slot;
    the first resonance branch generates a first resonance point to cover a low frequency band;
    the second resonance branch generates a second resonance point;
    the parasitic branch generates a third resonance point, and the second resonance point and the third resonance point are combined to expand a high frequency bandwidth.

2. The antenna for a mobile phone according to claim 1, wherein the metal mobile phone case is provided with a groove extending in the longitudinal direction of the metal mobile phone case and defining an upper end intersecting with the first slot, and the groove is symmetrical with the second slot with respect to a longitudinal center line of the metal mobile phone case and filled with the dielectric filler.

3. The antenna for a mobile phone according to claim 2, wherein the groove has a width of 1-3 mm, a length of 8-16 mm and a depth of 0.1-0.3 mm.

4. The antenna for a mobile phone according to claim 2, wherein the exciting sheet comprises:
    a horizontal branch extending in the transverse direction of the metal mobile phone case and positioned below the first slot; and
    a vertical branch extending in the longitudinal direction of the metal mobile phone case, defining a lower end connected with a first end of the horizontal branch and an upper end provided with a feeding signal access point, and across the first slot in the width direction of the first slot.

5. The antenna for a mobile phone according to claim 4, wherein the horizontal branch has a length of 15-21 mm and a width of 1-3 mm, and the vertical branch has a length of 7-13 mm and a width of 5-9 mm.

6. The antenna for a mobile phone according to claim 2, wherein the dielectric filler comprises:
- an isolating portion disposed between the metal mobile phone case and the exciting sheet;
- a first slot filling portion disposed at the isolating portion and configured to fill the first slot;
- a second slot filling portion disposed at the isolating portion and configured to fill the second slot; and
- a groove filling portion disposed at the isolating portion and configured to fill the groove.

7. The antenna for a mobile phone according to claim 1, wherein the first slot has a width of 1-3 mm and a length of 60-70 mm.

8. The antenna for a mobile phone according to claim 1, wherein the second slot has a width of 1-3 mm and a length of 8-16 mm.

9. The antenna for a mobile phone according to claim 1, wherein a distance between the exciting sheet and an inner surface of the metal mobile phone case is in a range of 0.5-1 mm.

10. The antenna for a mobile phone according to claim 1, wherein the dielectric filler has a dielectric constant less than 3.

11. The antenna for a mobile phone according to claim 1, wherein a distance between the circuit board and an inner surface of the metal mobile phone case is in a range of 2-4 mm.

12. The antenna for a mobile phone according to claim 1, wherein the circuit board comprises an insulating layer and a conducting layer, and the clearance zone is formed by removing the conducting layer in a partial region of the insulating layer.

13. The antenna for a mobile phone according to claim 1, wherein the clearance zone is positioned at a lower end of the circuit board.

14. The antenna for a mobile phone according to claim 13, wherein the circuit board has a length of 115-127 mm and a width of 58-66 mm, and the clearance zone has a length of 58-66 mm and a width of 5-9 mm.

15. The antenna for a mobile phone according to claim 13, wherein the parasitic branch is configured to have an L-shape.

16. The antenna for a mobile phone according to claim 13, wherein each of two longitudinal edges of the circuit board is provided with two earth lugs abutting against the metal mobile phone case.

17. A mobile phone, comprising the antenna for a mobile phone according to claim 1.

* * * * *